(12) United States Patent
Mehra et al.

(10) Patent No.: US 10,873,597 B1
(45) Date of Patent: Dec. 22, 2020

(54) CYBER ATTACK EARLY WARNING SYSTEM

(71) Applicant: FireEye, Inc., Milpitas, CA (US)

(72) Inventors: Divyesh Mehra, Foster City, CA (US); Abhishek Singh, Morgan Hill, CA (US)

(73) Assignee: FireEye, Inc., Milpitas, CA (US)

( * ) Notice: Subject to any disclaimer, the term of this patent is extended or adjusted under 35 U.S.C. 154(b) by 111 days.

(21) Appl. No.: 15/817,006

(22) Filed: Nov. 17, 2017

Related U.S. Application Data

(63) Continuation of application No. 14/872,003, filed on Sep. 30, 2015, now Pat. No. 9,825,989.

(51) Int. Cl.
  *H04L 29/06* (2006.01)
  *H04L 12/24* (2006.01)

(52) U.S. Cl.
  CPC .......... *H04L 63/145* (2013.01); *H04L 41/147* (2013.01); *H04L 63/1416* (2013.01); *H04L 63/1425* (2013.01)

(58) Field of Classification Search
  CPC ............... H04L 63/145; H04L 63/1425; H04L 63/1441; H04L 63/1491; H04L 63/1433; H04L 63/14; H04L 41/147; H04L 2463/141; H04L 2463/144
  See application file for complete search history.

(56) References Cited

U.S. PATENT DOCUMENTS

| 4,292,580 | A | 9/1981 | Ott et al. |
| 5,175,732 | A | 12/1992 | Hendel et al. |
| 5,319,776 | A | 6/1994 | Hile et al. |
| 5,440,723 | A | 8/1995 | Arnold et al. |

(Continued)

FOREIGN PATENT DOCUMENTS

| GB | 2439806 A | 1/2008 |
| GB | 2490431 A | 10/2012 |

(Continued)

OTHER PUBLICATIONS

Marchette, David J., "Computer Intrusion Detection and Network Monitoring: A Statistical Viewpoint", ("Marchette"), (2001).

(Continued)

*Primary Examiner* — Tae K Kim
(74) *Attorney, Agent, or Firm* — Rutan & Tucker, LLP

(57) ABSTRACT

A system and method for generating an alert regarding a potential attack is described. The method involves receiving data associated with previously analyzed or known malware attacks by a first network device. Additionally, the first network device receives an attack alert associated with an object analyzed and identified as suspicious by a second network device. The attack alert includes information associated with the suspicious object. For alert generation, at least a portion of the information of the attack alert is provided to a system configured to at least (i) extract feature(s) from the attack alert, (ii) determine similarities between the extracted features and features associated with the previously analyzed or known malware attacks to determine a result, (iv) compute an attack value based on the result and at least a portion of the extracted features including time-dependent and/or independent features, and (v) generate an alert based on the attack value.

25 Claims, 5 Drawing Sheets

(56) References Cited

U.S. PATENT DOCUMENTS

| | | | |
|---|---|---|---|
| 5,490,249 A | 2/1996 | Miller | |
| 5,657,473 A | 8/1997 | Killean et al. | |
| 5,802,277 A | 9/1998 | Cowlard | |
| 5,842,002 A | 11/1998 | Schnurer et al. | |
| 5,960,170 A | 9/1999 | Chen et al. | |
| 5,978,917 A | 11/1999 | Chi | |
| 5,983,348 A | 11/1999 | Ji | |
| 6,088,803 A | 7/2000 | Tso et al. | |
| 6,092,194 A | 7/2000 | Touboul | |
| 6,094,677 A | 7/2000 | Capek et al. | |
| 6,108,799 A | 8/2000 | Boulay et al. | |
| 6,154,844 A | 11/2000 | Touboul et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sørhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petry et al. | |
| 6,971,097 B1 | 11/2005 | Wallman | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,058,822 B2 | 6/2006 | Edery et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,096,498 B2 | 8/2006 | Judge | |
| 7,100,201 B2 | 8/2006 | Izatt | |
| 7,107,617 B2 | 9/2006 | Hursey et al. | |
| 7,159,149 B2 * | 1/2007 | Spiegel | G06F 21/566 709/224 |
| 7,213,260 B2 | 5/2007 | Judge | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,243,371 B1 | 7/2007 | Kasper et al. | |
| 7,249,175 B1 | 7/2007 | Donaldson | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,546,638 B2 | 6/2009 | Anderson et al. | |
| 7,565,550 B2 | 7/2009 | Liang et al. | |
| 7,568,233 B1 | 7/2009 | Szor et al. | |
| 7,584,455 B2 | 9/2009 | Ball | |
| 7,603,715 B2 | 10/2009 | Costa et al. | |
| 7,607,171 B1 | 10/2009 | Marsden et al. | |
| 7,620,986 B1 * | 11/2009 | Jagannathan | H04L 63/1425 713/150 |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,730,011 B1 | 6/2010 | Deninger et al. | |
| 7,739,740 B1 | 6/2010 | Nachenberg et al. | |
| 7,743,419 B1 * | 6/2010 | Mashevsky | G06F 21/552 713/187 |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,836,502 B1 | 11/2010 | Zhao et al. | |
| 7,849,506 B1 | 12/2010 | Dansey et al. | |
| 7,854,007 B2 | 12/2010 | Sprosts et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,387 B2 | 5/2011 | Frazier et al. | |
| 7,937,761 B1 | 5/2011 | Bennett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,201,246 B1 | 6/2012 | Wu et al. | |
| 8,204,984 B1 | 6/2012 | Aziz et al. | |
| 8,209,748 B1 | 6/2012 | Nordstrom et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,266,091 B1 | 9/2012 | Gubin et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,310,923 B1 | 11/2012 | Nordstrom et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |

(56) References Cited

U.S. PATENT DOCUMENTS

| | | |
|---|---|---|
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,578,497 B2 * | 11/2013 | Antonakakis ......... G06F 21/577 726/24 |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,180 B2 | 7/2014 | Kumar et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shifter et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,092,616 B2 | 7/2015 | Kumar et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,124,625 B1 * | 9/2015 | Seger ................. H04L 63/1433 |
| 9,159,035 B1 | 10/2015 | Ismael et al. |
| 9,166,994 B2 * | 10/2015 | Ward ................. H04L 63/1425 |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 * | 1/2016 | Bennett ................. H04L 63/145 |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 * | 6/2016 | Rivlin ................. H04L 63/1416 |
| 9,367,681 B1 | 6/2016 | Ismael et al. |
| 9,386,030 B2 | 7/2016 | Vashist et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |

(56) References Cited

U.S. PATENT DOCUMENTS

| | | |
|---|---|---|
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van De Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |

(56) References Cited

U.S. PATENT DOCUMENTS

| | | |
|---|---|---|
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0079379 A1* | 4/2007 | Sprosts ................ G06Q 10/107 726/24 |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0192859 A1* | 8/2007 | Shahar .................. G06F 21/552 726/22 |
| 2007/0198275 A1 | 8/2007 | Malden et al. |
| 2007/0208822 A1 | 9/2007 | Wang et al. |
| 2007/0220607 A1* | 9/2007 | Sprosts ................ G06Q 10/107 726/24 |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1* | 4/2008 | Syversen ............ H04L 63/0227 726/23 |
| 2008/0115221 A1* | 5/2008 | Yun ...................... G06F 21/552 726/25 |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0055925 A1* | 3/2011 | Jakobsson ............ G06F 21/552 726/25 |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0167495 A1 | 7/2011 | Antonakakis et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |

(56) References Cited

U.S. PATENT DOCUMENTS

| | | |
|---|---|---|
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0031625 A1* | 1/2013 | Lim ............... G06F 21/552 726/22 |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0340079 A1* | 12/2013 | Gottlieb ............. H04L 63/1416 726/23 |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0082730 A1* | 3/2014 | Vashist ............. H04L 63/1416 726/23 |
| 2014/0130158 A1 | 5/2014 | Wang et al. |
| 2014/0137180 A1 | 5/2014 | Lukacs et al. |
| 2014/0157405 A1* | 6/2014 | Joll ............... H04L 63/1425 726/22 |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237599 A1* | 8/2014 | Gertner ............. H04L 63/145 726/24 |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1* | 11/2014 | Cunningham ...... H04L 63/1441 726/22 |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0237068 A1* | 8/2015 | Sandke ............. H04L 63/1466 726/23 |
| 2015/0319185 A1* | 11/2015 | Kirti ............... H04L 63/1416 726/23 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0275289 A1* | 9/2016 | Sethumadhavan ... G06F 21/552 |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0068816 A1* | 3/2017 | Cavazos ............. G06F 21/562 |
| 2017/0083703 A1* | 3/2017 | Abbasi ............. G06F 21/561 |
| 2017/0093910 A1* | 3/2017 | Gukal ............. H04L 63/1416 |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 02/23805 A2 | 3/2002 |
| WO | 0206928 | 11/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Margolis, P.E., "Random House Webster's 'Computer & Internet Dictionary 3rd Edition'", ISBN 0375703519, (Dec. 1998).

(56) References Cited

OTHER PUBLICATIONS

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Appl. No. 14/872,003, filed Sep. 30, 2015 Non-Final Office Action dated Jan. 17, 2017.

U.S. Appl. No. 14/872,003, filed Sep. 30, 2015 Notice of Allowance dated Aug. 25, 2017.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.--mining.pdf-.

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).

AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cisco, Configuring the Catalyst Switched Port Analyzer (SPAN) ("Cisco"), (1992).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Crandall, J.R., et al., "Minos:Control Data Attack Prevention Orthogonal to Memory Model", 37th International Symposium on Microarchitecture, Portland, Oregon, (Dec. 2004).

Deutsch, P., "Zlib compressed data format specification version 3.3" RFC 1950, (1996).

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the

(56) References Cited

OTHER PUBLICATIONS

5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric, et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Sibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik, "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField= Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael, et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Vlalware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Hiroshi Shinotsuka, Malware Authors Using New Techniques to Evade Automated Threat Analysis Systems, Oct. 26, 2012, http://www.symantec.com/connect/blogs/, pp. 1-4.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

* cited by examiner

CYBER ATTACK EARLY WARNING SYSTEM

CROSS-REFERENCE TO RELATED APPLICATIONS

This application is a continuation of U.S. patent application Ser. No. 14/872,003, filed Sep. 30, 2015, now U.S. Pat. No. 9,825,989, issued Nov. 21, 2017, the entire contents of which are incorporated by reference herein.

FIELD

Embodiments of the disclosure relate to the field of cyber-security. More specifically, one embodiment of the disclosure relates to a system, apparatus and method for providing an early warning of a potential attack on a client device based on real-time analysis.

GENERAL BACKGROUND

Over the last decade, malicious software has become a pervasive problem for Internet users as many networked resources include vulnerabilities that are subject to attack. For instance, over the past few years, an increasing number of vulnerabilities are being discovered in software that is loaded onto network devices, such as vulnerabilities within operating systems, for example. While some vulnerabilities continue to be addressed through software patches, prior to the release of such software patches, network devices will continue to be targeted for attack by malware, namely information such as computer code that attempts during execution to take advantage of a vulnerability in computer software by acquiring sensitive information or adversely influencing or attacking normal operations of the network device or the entire enterprise network.

Moreover, with the proliferation of the Internet, social media, and email, malware is capable of spreading more quickly and effecting a larger subset of the population than ever before. In response, systems have been developed to remove and/or quarantine malware. For example, users are generally informed to "scan" their various devices and/or systems using traditional security measures such as "anti-virus" software that is configured to remove any malware that may have been installed therein. Unfortunately, users are at the mercy of the most recent update of their anti-virus software, which may or may not include information to prevent possible malware exploits.

Furthermore, modern malware is becoming increasingly targeted, such that particular users, industries, or even specific segments are being sought, thereby circumventing even the most recently updated and detailed security measures that are usually generic in nature. The issue is further exacerbated because malware is also becoming increasingly sophisticated, to the point that such malware may go undetected by anti-virus software, or go so far as circumventing anti-virus measures altogether.

Accordingly, a need exists for an early warning system that is preventative, rather than reactive after the fact, to predict potential malware attacks prior to their occurrence, and notify targets that have a high probability of being attacked.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
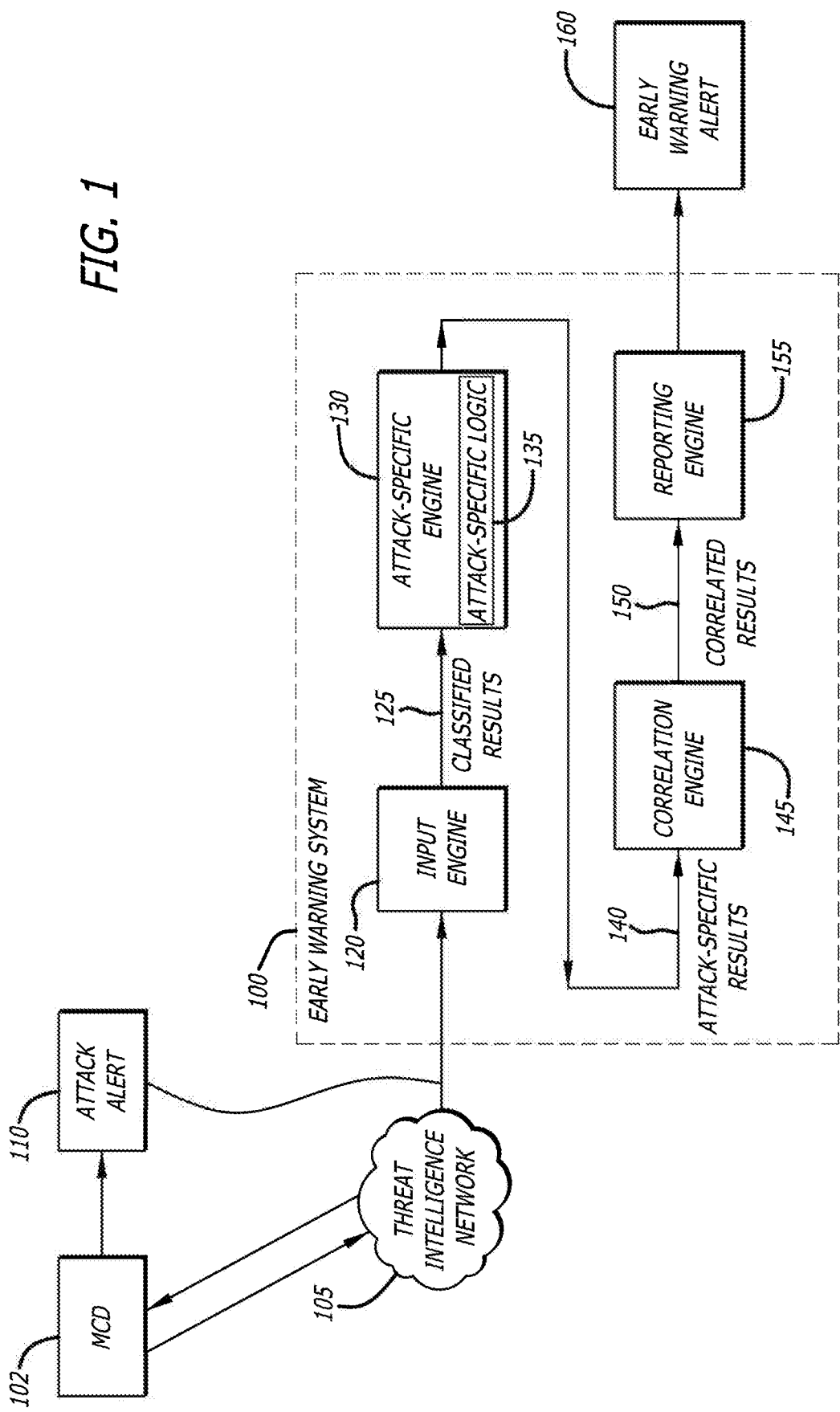
FIG. 1 is an exemplary block diagram of an operational flow of an early warning system.

Embodiments of the present disclosure generally relate to a cyber attack early warning system that is configured to predict and notify probable targets of a potential malware attack prior to its occurrence.

According to one embodiment of the disclosure, network traffic is analyzed such that malicious network traffic is filtered and preferably prevented from executing, using a remote source. Herein, upon detection of potentially malicious network traffic, the remote source is configured to generate an "attack alert" that is communicated to the cyber attack early warning system, which comprises an input engine, an expert engine, a correlation engine, and a reporting engine.

When the attack alert is received by the cyber attack early warning system, the attack alert is analyzed and classified. For example, the attack alert may correspond to any of various malware attack types, including without limitation Advanced Persistent Threats (APT), Point-Of-Sales attacks (POS), Crimeware attacks, and the like.

Once the attack alert is classified, an attack-specific engine is configured to provide further in-depth analysis of the attack alert, including the application of a plurality of analysis mechanisms, such as various algorithms and/or models specific to the type of malware attack. It is contemplated that the attack-specific engine may also analyze elements of past attacks and related data. The results of these various analyses are correlated to compute an "attack value" so that probable attack targets may be notified. For example, probable attack targets may include companies or individuals in the same industry, geographic region, and capacity, for example, without limitation. If the determined attack value matches or exceeds a predetermined threshold value, then an early warning alert is provided to probable targets of a malware attack. If the attack value is less than the predetermined threshold, then the early warning alert is not generated.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected characteristics and, during processing, a set of expected behaviors. The object may also exhibit a set of unexpected characteristics and a set of unexpected behaviors that may evidence an exploit and potentially allow the object to be classified as an exploit.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may include packets, frames, or cells.

As an illustrative example, an object may include a set of flows such as (1) a sequence of transmissions in accordance with a particular communication protocol (e.g., User Datagram Protocol (UDP); Transmission Control Protocol (TCP); or Hypertext Transfer Protocol (HTTP); etc.), or (2) inter-process communications (e.g., Remote Procedure Call "RPC" or analogous processes, etc.). Similar, as another illustrative example, the object may be a self-contained element, where different types of such objects may include an executable file, non-executable file (such as a document or a dynamically link library), a Portable Document Format (PDF) file, a JavaScript file, Zip file, a Flash file, a document (for example, a Microsoft Office® document), an electronic mail (email), downloaded web page, an instant messaging element in accordance with Session Initiation Protocol (SIP) or another messaging protocol, or the like.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. In the alternative, malware may correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list from an endpoint device to cloud storage without receiving permission from the user.

The term "shellcode" refers to a small piece of executable code that resides in data (e.g., is injected into data), is used as a payload of malware, and, in some cases, contains a shell command to execute an exploit.

In certain instances, the term "detected" is used herein to represent that there is a prescribed level of confidence (or probability) on the presence of an exploit or attack within an object under analysis.

The term "network device" should be construed as any electronic device with the capability of connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, etc.

The term "computerized" generally represents that any corresponding operations are conducted by hardware in combination with software and/or firmware. Also, the terms "compare" or "comparison" generally mean determining if a match (e.g., a certain level of correlation) is achieved between two items where one of the items may include a particular signature pattern.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Early Warning Alert Generation Methodology

A. Operational Flow for Early Warning Alert Generation

Referring to FIG. 1, an exemplary logical representation of a cyber attack early warning system 100 (hereinafter "EWS") is shown. Herein, some or all of various incoming objects associated with monitored network traffic are received by an exemplary malicious content detection (MCD) system 102, as described in U.S. patent application Ser. No. 14/042,483, filed Sep. 30, 2013 and incorporated herein by reference in its entirety, which preferably comprises virtual execution logic that is part of a dynamic analysis engine, either directly or via an optional static analysis engine. According to one embodiment of the disclosure, the static analysis engine is configured as a capture and filter device that receives the incoming objects and conducts heuristics, exploit signature checks and/or vulnerability signature checks on some or all of the objects, to identify "suspicious" objects having one or more characteristics associated with an exploit. It is envisioned that the MCD system 102 may also perform a behavioral analysis of the incoming objects. For example, the MCD system 102 may analyze one or more objects to determine how the object was received, e.g., via browser download, email attachment, external drive, SQL injection compromise, and the like, without limitation. Furthermore, certain artifacts that may be unique with respect to a type of malware attack may be analyzed. The behavioral analysis may also consider propagation mechanisms of an object, to determine how the object communicates or navigates across and/or through a network, for example.

When suspicious objects are identified by the MCD system 102, an attack alert 110 is generated and received by the EWS 100. The attack alert 110 may comprise analysis logs detailing certain characteristics of exploits, such as from one or more virtual machines, attack metadata, communication logs from the client device and/or the MCD system 102, and various other information corresponding to a malware attack, without limitation.

As shown in FIG. 1, the EWS 100 comprises an input engine 120, an attack-specific engine 130, a correlation engine 145, and a reporting engine 155. According to one embodiment of the disclosure, each of the input engine 120, the attack-specific engine 130, the correlation engine 145, and the reporting engine 155 may correspond to one or more software modules stored in non-transitory storage medium that, when executed by one or more hardware processors, performs the below identified functionality. Alternatively, some or all of these engine 120, 130, 145 and 155 may correspond to hardware logic. Independent of the system architecture, the communicative coupling between the input engine 120, attack-specific engine 130, correlation engine 145, and reporting engine 155 is provided in a generally serial configuration. However, it is contemplated that some or all of the aforementioned engines may be provided in a parallel configuration, where the attack alert 110 may be processed concurrently, or in any other configuration such as a daisy-chain or any other topology without limitation.

In one embodiment, the EWS 100 and MCD system 102 are communicatively coupled with a threat intelligence network 105. The threat intelligence network 105 may be configured to store and access data regarding malware attacks across a number of objects, including for example, web-based, email-based, and file-based threats. Moreover, it is envisioned that the threat intelligence network 105 may be configured to store historical information regarding previously analyzed and/or known malware attacks. The threat intelligence network 105 may also be periodically and/or aperiodically updated so as to store information regarding new malware attacks, reports, alerts, and/or corresponding features, for example.

Once generated, some or all of the data associated with the attack alert 110 is routed to the EWS 100 using pull coding, such that the initial request for the attack alert 110 originates from the EWS 100, and is then responded to by a server, such as via the threat intelligence network 105. In one embodiment, using pull coding, the threat intelligence network 105 may be idle until the EWS 100 interrupts the threat intelligence network 105 with a request. Upon receipt of the request, the threat intelligence network 105 may become an active component. In one embodiment, the threat intelligence network 105 may be configured so as to determine its own interest in the request and also to consider the origin of the request prior to communicating any further data. It should be appreciated, however, that other routing methodologies such as push technologies, or some hybrid of push/pull technologies are within the scope and spirit of the present disclosure.

Upon receipt by the EWS 100, the attack alert 110 is communicated to the input engine 120 for analysis, feature extraction and classification using various logic, such as heuristics, exploit/vulnerability logic and parsing logic, for example, as explained in detail further below. When the attack alert 110 is classified, the input engine 120 generates a classified result 125 that is communicated to the attack-specific engine 130, which provides attack-specific analysis with respect to the classified result 125. As shown, the attack-specific engine 130 includes attack-specific logic 135 that may be specifically tailored to analyze one of various malware attacks, including by way of non-limiting example, APT, POS, and Crimeware attacks.

For example, the attack-specific logic 135 may comprise a plurality of analysis mechanisms such as one or more heuristic, probabilistic, and/or machine learning algorithms specific to a type of malware attack. Consequently, a particular attack alert may be compared with previously known attacks, incidences, feature sets, vulnerabilities, attack signatures, and the like, to determine correspondence with respect to a plurality of time-dependent and time-independent features. In one embodiment, the time dependent features may comprise the number of request-response sessions, and/or the time, day, and month of the attack. Similarly, in one embodiment, time-independent features may comprise the time-independent features such as the geographic location of the attack target, industry, employees of an organization, either alone or in combination, without limitation. The combination of time-dependent and time-independent features are then examined using a plurality of correlation techniques, so as to determine a degree of similarity based on the presence and/or volume of the time-dependent and time-independent features and generate an attack-specific engine result 140 that is communicated to the correlation engine 145.

Using probabilistic or machine-learning algorithms, the correlation engine 145 is configured to determine an "attack value", which in one embodiment comprises a real-time value that may be based on at least the attack-specific engine result 140, time-dependent and time-independent features, and a consideration of potential attack targets, for example. The correlation engine 145 is configured to compare the attack value with a predetermined threshold value to determine whether an early warning alert should be generated.

In one embodiment, the predetermined threshold value may represent, for example, certain incidences, feature sets, vulnerabilities, and/or attack signatures specific to any of various malware attacks. More specifically, it is envisioned that the predetermined threshold value may comprise any plurality of characteristics of a particular malware attack, including by way of non-limiting example, the number and/or existence of various API calls, request-response sessions, and geographical information regarding the most recent, and/or previously targeted parties. It should be understood that the predetermined threshold value might vary for different types of malware attacks. Thus, for certain malware attacks, only one characteristic may be required to be present so that the attack value matches or exceeds the threshold value. Of course, in other instances, the threshold value may be adapted to accommodate any number of characteristics depending on the type of malware attack.

In general, if the attack value matches or exceeds the predetermined threshold value, then a correlated result 150 is generated and communicated to the reporting engine 155 for final processing and reporting. In the event that the attack value fails to exceed the predetermined threshold, then the correlated results 150 may indicate, for example, that the reporting engine 155 should not generate an early warning alert or report 160. The correlated results 150 may be stored in a database for future reference.

If the correlated results 150 indicate that an early warning alert or report 160 should be generated, then at least portions of the correlated results 150 and attack-specific engine results 140 may be combined and communicated to the reporting engine 155. The reporting engine 155 may issue an early warning alert or report 160 (e.g., an email message, text message, display screen image, etc.) to security administrators for example, communicating the urgency in handling and preferably preventing one or more predicted attacks.

Alternatively, the early warning alert or report 160 may trigger further analysis of the object by the MCD system 102, for example, to verify behavior of the object as an exploit. The early warning alert or report 160 may also include detailed instructions pertaining to specific attack types, potential issues thereto, security holes, and best practices to prevent one or more predicted malware attacks. It should be appreciated that the reporting engine 155 may also be configured to update the threat intelligence network 105 with information corresponding to the instantly analyzed attack alert for future reference and/or further processing.

B. General Architecture of Network Device Deploying Early Warning Alert Generation Logic Referring to FIG. 2A, an exemplary block diagram of an EWS detection environment 200 communicatively coupled to a communication network 261 is shown. The EWS detection environment 200 comprises a server device 260, an optional firewall 262, an optional network interface 270, a MCD system 263, a client device 264, and a threat intelligence network 265 that is communicatively coupled with the MCD system 263 and the exemplary EWS 100.

Figure 2A:
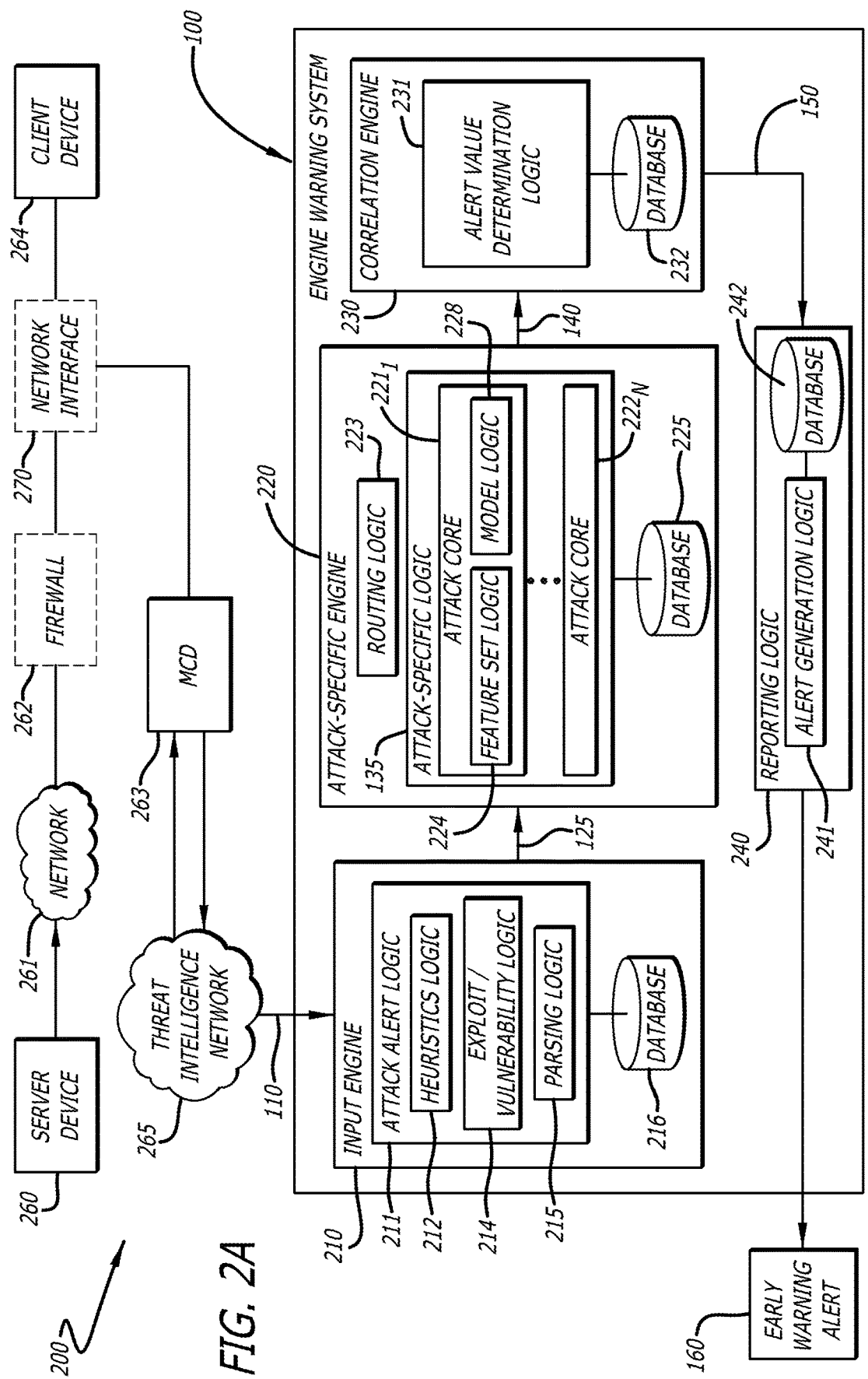
FIG. 2A is an exemplary block diagram of a communication system deploying a cyber attack early warning system via a network.

According to the embodiment illustrated in FIG. 2A, the MCD system 263 is a network device that is adapted to analyze information associated with network traffic routed over a communication network 261 between at least one server device 260 and at least one client device 264. The communication network 261 may include a public network such as the Internet, in which case an optional firewall 262 (represented by dashed lines) may be interposed on the communication path between the public network and the client device 264. Alternatively, the communication network 261 may be a private network such as a wireless data telecommunication network, wide area network, a type of local area network (LAN), or a combination of networks.

As shown, the EWS 100 may be communicatively coupled with the communication network 261 via a network interface 270. In general, the network interface 270 operates as a data capturing device (sometimes referred to as a "tap" or "network tap") that is configured to receive data propagating to/from the client device 264 and provide at least some of this data to the MCD system 263. Alternatively, the MCD system 263 may be positioned behind the firewall 262 and in-line with client device 264.

According to one embodiment of the disclosure, the network interface 270 is capable of receiving and routing objects associated with network traffic to the MCD system 263. The network interface 270 may provide the entire traffic or a certain subset of the network traffic, for example, such as one or more files that are part of a set of flows, packet payloads, or the like. In some embodiments, although not shown, network interface 270 may be contained within the MCD system 263.

As further shown in FIG. 2A, the EWS 100 comprises input engine 210, attack-specific engine 220, correlation engine 230, and reporting logic 240. Although the components disposed within the EWS 100 are shown in a communicatively coupled serial configuration, it is envisioned that other topologies may also be implemented, such as, for example, parallel and daisy-chain configurations. It should be appreciated that the input engine 210, attack-specific engine 220, correlation engine 230, and reporting logic 240 may each be separate and distinct components, but the combination of components may also be implemented in a single block and/or core.

Figure 2B:
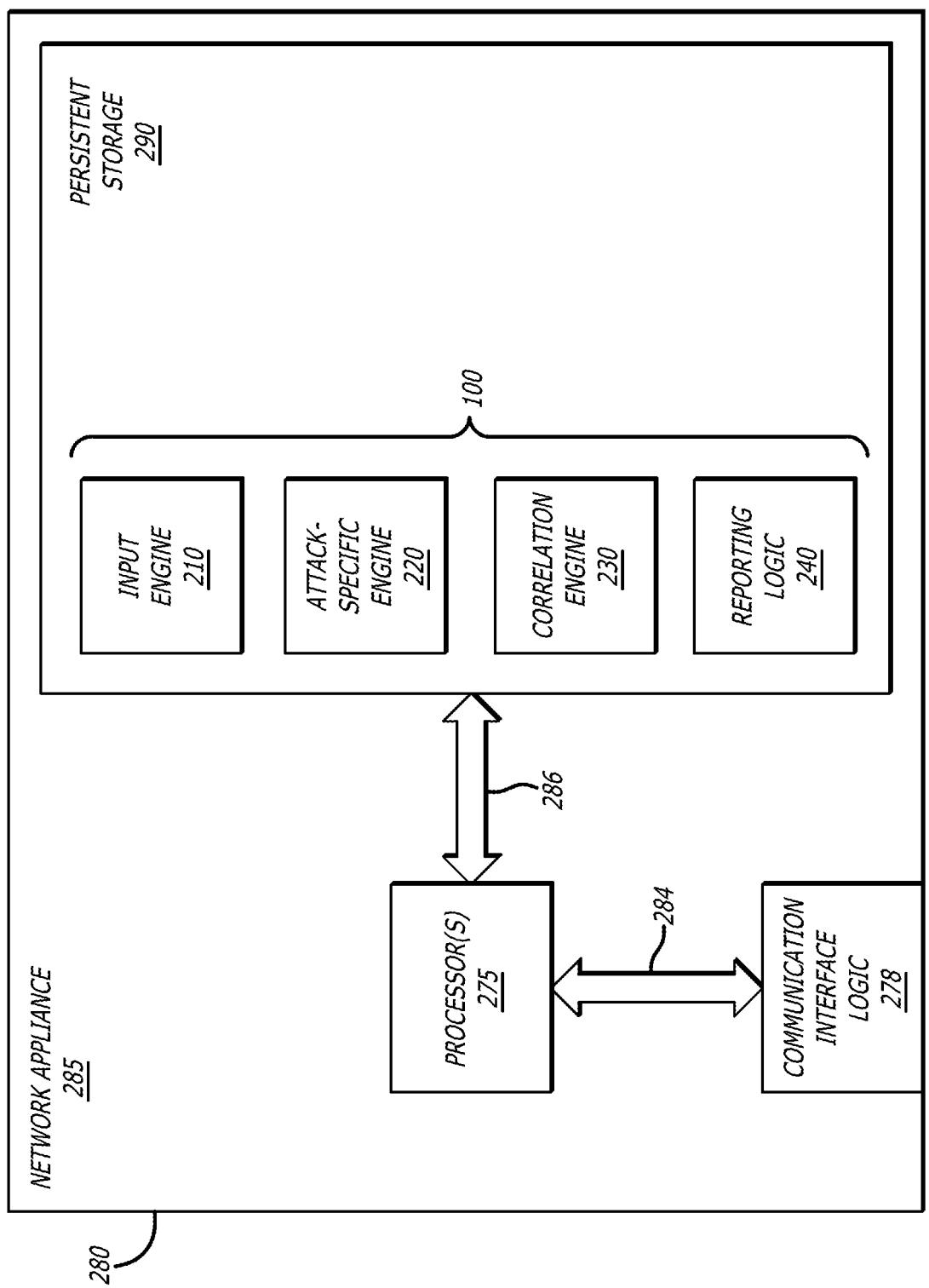
FIG. 2B is an exemplary embodiment of a logical representation of the cyber attack early warning system of FIG. 2A.

In some embodiments, as best shown in FIG. 2B, the input engine 210 comprises one or more software modules that, when executed by one or more processors, receives the attack alert 110 from the threat intelligence network 265 for classification, prior to being communicated to the attack-specific engine 220. In some embodiments, as shown in FIG. 2A, the input engine 210 may comprise one or more software modules such as attack alert logic 211, when executed by one or more processors, extracts certain data from the attack alert 110 so as to classify the attack using heuristics, exploit signature checks and/or vulnerability signature checks, for example. It should be understood that the attack alert logic 211 and the input engine may be one or more software modules executed by the same processor or different processors, where these different processors may be located within the same processor package (e.g., different processor cores) and/or located at remote or even geographically remote locations that are communicatively coupled (e.g., by a dedicated communication link) or a network.

Referring again to FIG. 2A, the attack alert logic 211 may comprise modules dedicated to certain tasks, such as, by way of non-limiting example, heuristics logic 212, exploit/vulnerability matching logic 214, and/or parsing logic 215. The heuristics logic 212 may be adapted for analysis of certain portions of network traffic under analysis to determine whether any portion thereof corresponds to either (i) a "suspicious" identifier such as either a particular Uniform Resource Locator "URL" that has previously been determined as being associated with known exploits, a particular source or destination (IP or MAC) address that has previously been determined as being associated with known exploits; (ii) a particular exploit pattern; or (iii) a particular shellcode pattern, alone or in combination, without limitation. When deployed, the attack alert logic 211 may be adapted to perform exploit signature checks, which may involve a comparison of an object under analysis against one or more pre-stored exploit signatures (e.g., pre-configured and predetermined attack patterns) from database 216. Additionally or in the alternative, the attack alert logic 211 may be configured with parsing logic 215 so as to separate various aspects of the attack alert 110 for more efficient and timely processing. For example, the parsing logic 215 may be configured so as to receive data associated with the attack alert 110 to construct a data structure, including by way of non-limiting example, a parse tree, abstract syntax tree or any other hierarchical structure, thereby providing a structural representation of data associated with the attack alert 110.

Additionally or in the alternative, the attack alert logic 211 may be configured with exploit/vulnerability matching logic 214 that is adapted to perform vulnerability signature checks, namely a process of uncovering deviations in messaging practices set forth in applicable communication protocols (e.g., HTTP, TCP, etc.). The term "signature" designates an indicator of a set of characteristics and/or behaviors exhibited by one or more exploits that may not be unique to those exploit(s). Thus, a match of the signature may indicate to some level of probability, often well less than 100%, that the attack alert 110 comprises a certain exploit. In some contexts, those of skill in the art have used the term "signature" as a unique identifier or "fingerprint," for example, of a specific virus or virus family (or other exploit), which is generated for instance as a hash of its machine code, and that is a special sub-case for purposes of this disclosure.

As further shown in FIG. 2A, once the attack alert 110 has been analyzed, the input engine 210 generates classified results 125 based on determinations of the attack alert logic 110. The classified results 125 may, among others, classify any malware and/or exploits detected into a family of malware and/or exploits, describe the malware and/or exploits and provide the metadata associated with any object(s) within which the malware and/or exploits were detected. Furthermore, the attack alert logic 211 may store the classified results 125 in the database 216 for future reference.

As shown, the classified results 125 are communicated to the attack-specific engine 220. The attack-specific engine 220 comprises attack-specific logic 135 that comprises a plurality of attack cores $222_1$-$222_N$, each specific to one of various types of malware attacks, including by way of non-limiting example, APT, POS, and Crimeware attacks. The attack-specific engine 220 further comprises routing logic 223 that is configured so as to route the classified result 125 to one of the appropriate attack cores $222_1$-$222_N$. It is envisioned that each of the attack cores $222_1$-$222_N$ is configured so as to analyze the content of the attack alert 110 and apply a plurality of analysis mechanisms specific to the type of malware attack. In one embodiment, each of the attack cores $222_1$-$222_N$ may be configured as a plug-in, extension, and/or an add-on, for example, so as to apply analysis mechanisms specific to the type of malware attack. Each of the plug-ins may include feature logic 224 specific to each type of attack, including, but not limited to network and operating system behavior when a client device and/or network is under a specific type of malware attack, as explained in further detail below. It is envisioned that each of the plug-ins may be configured so as to cooperate with any real-time data collection and/or processing capabilities of the EWS 100.

In one embodiment, each of the plurality of attack cores $222_1$-$222_N$ comprises feature logic 224 specific to each type of attack, based on, for example, attacks stored in a feature-set database 225 comprising historical data corresponding to known and/or previously analyzed attacks. More specifically, the feature logic 224 may comprise time-dependent features and time-independent features. With respect to time-dependent features, a particular attack alert may be compared with previously known attacks, incidences, attack signatures, and the like, so as to determine correspondence with respect to a plurality of time-dependent features such as the number of methods for a request-response over a predetermined period of time, the time of day of the attack, the duration of the attack, the month, year, execution time of the attack, and the like, without limitation. Furthermore, a plurality of time-independent features, as the name implies, may comprise features such as the geographic location of the attack target, industry, role/title of a specific party etc., without limitation. For example, in one embodiment, in the event that there is an APT attack, the feature-set database 225 may have information stored thereon relating to known APT attacks, such as the medium most often used in such attacks, e.g., a document, or PDF file, and the like; along with any correspondingly suspicious instructions, commands, and/or processes.

As shown in FIG. 2A, each of the attack cores $222_1$-$222_N$ further comprises one or more logic models 228 for further analysis of the classified result 125. It should be appreciated that the logic models 228 may comprise one or more software modules such as probabilistic logic, heuristic logic, and deterministic logic, that, when executed by one or more processors, extracts certain data from the classified result 125 so as to analyze it, at least in part, based on attack-specific (i) pattern matches; (ii) heuristic, probabilistic, or determinative analysis results; (iii) analyzed deviations in messaging practices set forth in applicable communication protocols (e.g., HTTP, TCP, etc.); (iv) analyzed compliance with certain message formats established for the protocol (e.g., out-of-order commands); and/or (v) analyzed header or payload parameters to determine compliance.

It should be understood that the logic models 228 may comprise one or more software modules executed by the same processor or different processors, where these different processors may be located within the same processor package (e.g., different processor cores) and/or located at remote or even geographically remote locations that are communicatively coupled (e.g., by a dedicated communication link) or a network. Once the attack-specific engine 220 has completed its analysis, an attack-specific result 140 comprising certain attack features is generated and communicated to the correlation engine 230. Furthermore, the attack-specific logic 135 may store the attack-specific result 140 in the feature-set database 225 for future reference.

The correlation engine 230 comprises alert value determination logic 231 and a database 232. The alert value determination logic 231 is communicatively coupled to the database 232, where it is envisioned that information regarding potential targets may be stored. Notable information that may be stored on the database 232 includes at least real time features corresponding to potential targets, such as geographic location, industries, segments, whether the target stores credit card information or other sensitive personal data, previous known attacks, alerts, current events, and specifics regarding the various targets' officers, board of directors, and the like.

The alert value determination logic 231 of the correlation engine 230 is configured using at least one of a probabilistic or machine-learning algorithm to determine, in real time, an attack value that represents a probability (or level of confidence) that a potential target may also be attacked. In doing so, the correlation engine 230 is configured so as to consider the attack features learned from the attack-specific engine 220, and real time features stored on the database 232. It is envisioned that the alert value determination logic 231 shall determine if the attack value matches or exceeds a predetermined threshold, so as to generate a correlated result 150 that indicates whether or not a probable target has been found, and therefore alerted with respect to the potential of a malware attack.

Consequently, the correlated result 150 is communicated to the alert generation logic 242 of the reporting logic 240, which may generate an alert for the client device 264 and/or route the alert to the threat intelligence network 265 for further analysis. In addition, the alert may be routed to the communication network 261 for further analysis by a network administrator, for example. The reporting logic 240 may issue an early warning alert or report 160 (e.g., an email message, text message, display screen image, etc.) to security administrators for example, communicating the urgency in handling one or more predicted attacks. The early warning alert or report 160 may trigger a further analysis of the object to verify the behavior of the object as an exploit. It is envisioned that the early warning alert or report 160 may also comprise instructions so as to prevent one or more predicted malware attacks. Finally, the reporting logic 240 may store the correlated results 150 in the database 242 for future reference.

Referring now to FIG. 2B, an exemplary embodiment of a logical representation of the cyber attack early warning system 100 of FIG. 2A is shown. In one embodiment, a network appliance 285 comprises a housing 280, which is made entirely or partially of a rigid material (e.g., hardened plastic, metal, glass, composite or any combination thereof) that protect circuitry within the housing 280, namely one or more processors 275 that are coupled to communication interface logic 278 via a first transmission medium 284. Communication interface logic 278 enables communications with other cyber attack early warning systems 100 and/or the threat intelligence network 265 of FIG. 2A, for example. According to one embodiment of the disclosure, communication interface logic 278 may be implemented as a physical interface including one or more ports for wired connectors. Additionally, or in the alternative, communication interface logic 278 may be implemented with one or more radio units for supporting wireless communications with other electronic devices.

Processor(s) 275 may further be coupled to persistent storage 290 via a second transmission medium 286. According to one embodiment of the disclosure, persistent storage 290 may include the cyber attack early warning system 100, which in one embodiment comprises (a) input engine 210; (b) attack-specific engine 220; (c) correlation engine 230; and reporting logic 240. It is envisioned that one or more of these engines (or logic units) could be implemented externally from the cyber attack early warning system 100 without extending beyond the spirit and scope of the present disclosure.

Figure 3:
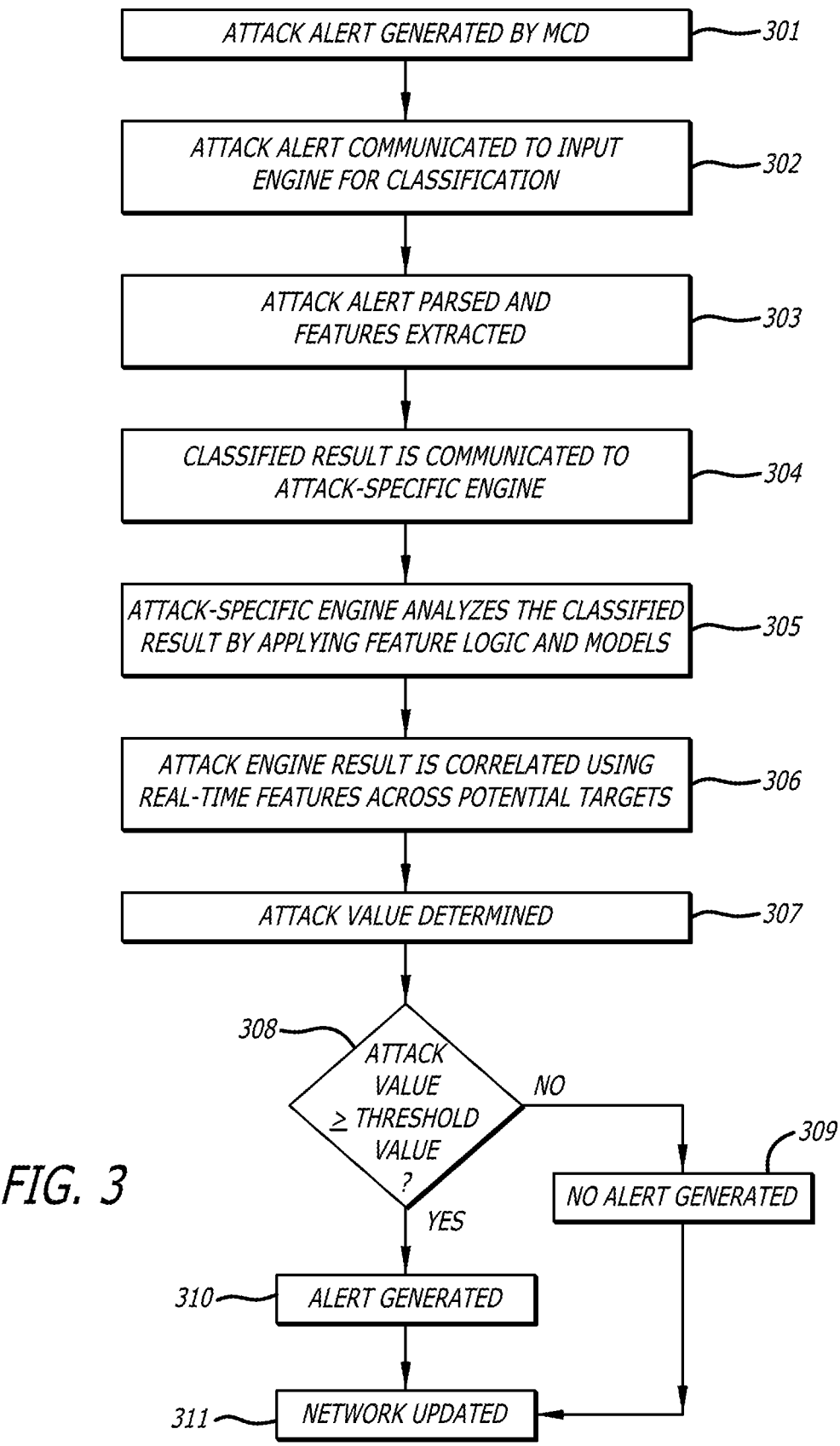
FIG. 3 is a flowchart of an exemplary method for providing early warning of a potential attack on a client device based on a real-time analysis of a plurality of factors.

Referring now to FIG. 3, a flowchart of an exemplary method for providing early warning of a potential attack on a system or device based on a real-time analysis. In block 301, upon detection of potentially malicious network traffic, the MCD system is configured to generate an attack alert. In block 302, the attack alert is received by the EWS 100 and communicated to the input engine 120. In block 303, the input engine 120 performs feature extraction and classification with respect to the attack alert. For example, the attack alert may correspond to any of various malware attack types, including without limitation APT, POS, Crimeware attacks, and the like. In block 304, once the attack alert is classified, the input engine's result is communicated to the attack-specific engine, which provides further in-depth analysis of the attack alert. As noted herein, the expert engine comprises a plurality of attack cores, each specific to one of various malware attacks, including by way of non-limiting example, APT, POS, and Crimeware attacks.

In block 305, each of the attack cores is configured to analyze the content of the attack alert and apply a plurality of analysis mechanisms specific to the type of malware attack. For example, utilizing the attack cores, a particular attack alert may be compared with previously known attacks, incidences, feature sets, attack signatures, etc. to determine correspondence with respect to a plurality of time-sensitive features such as the number of methods for a request-response, and/or the time of day of the attack. A plurality of time-insensitive features such as geographic location of the present attack target, industry, etc. may also be analyzed, without limitation.

In block 306, after analyzing the combination of time-sensitive and time-insensitive features, an attack-specific result is generated and communicated to the correlation engine so as to correlate the result using real-time features across a plurality of potential targets. In block 307, using probabilistic and/or machine-learning algorithms, the correlation engine is configured to determine an "attack value" based on the attack-specific result, and a consideration of probable attack targets. For example, probable attack targets may include companies in the same industry, geographic region, and/or companies having the same size/scale of a presently attacked target, without limitation. In block 308, if the determined attack value matches or exceeds a predetermined threshold value, then an early warning alert is provided in block 310 and communicated to probable targets of a malware attack. If the attack value is less than the predetermined threshold, then, at block 309, the early warning alert is not generated. In either event, however, the threat intelligence network 265 is updated with respect to any potential incident, and the corresponding results thereto.

C. Exemplary Alert

Figure 4:
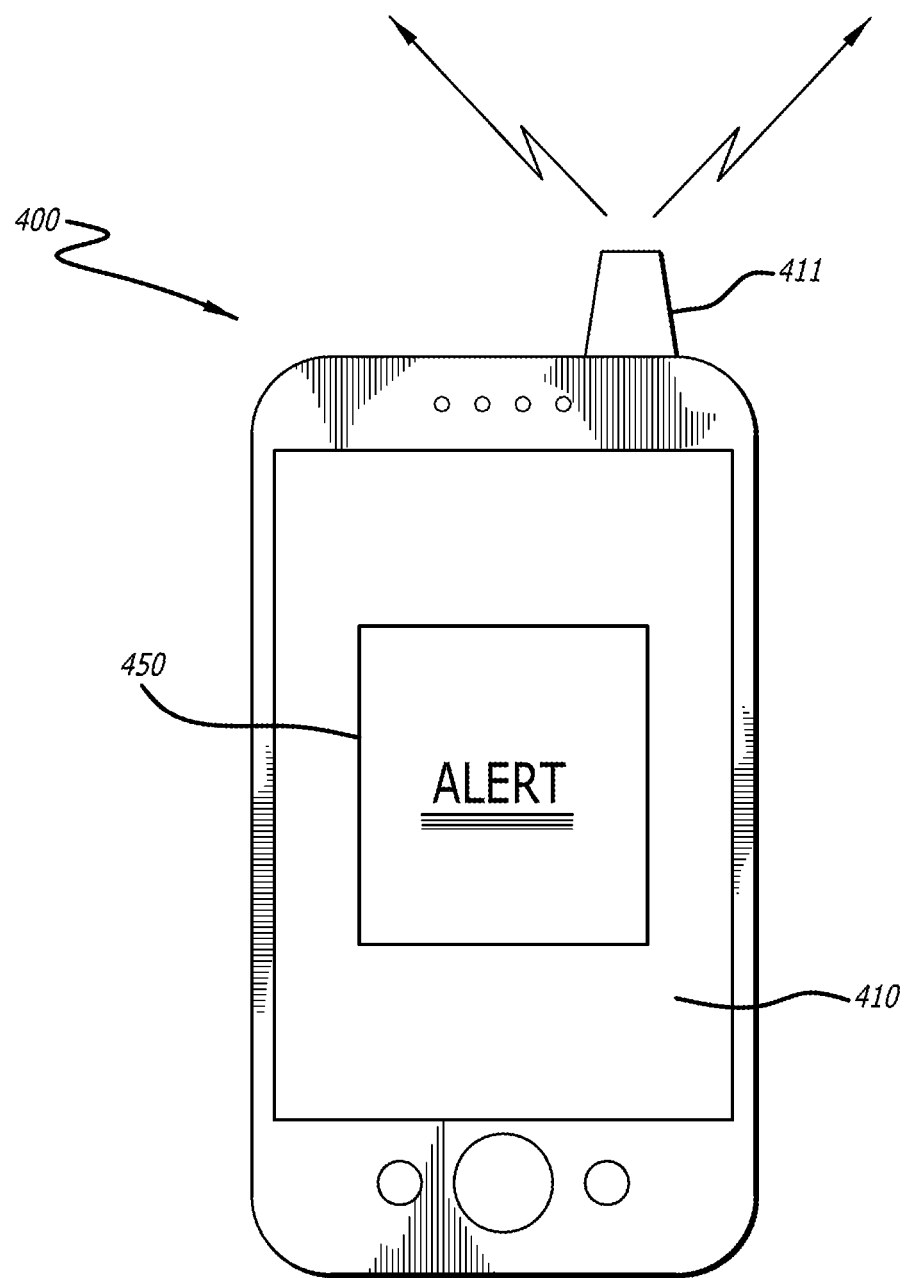
FIG. 4 is an exemplary network device demonstrating an alert according to the present disclosure.

Referring to FIG. 4, a network device may be configured to receive an early warning alert or report 160. In FIG. 4, for illustrative purposes, the network device is represented as a mobile network device 400 (e.g., smartphone, tablet, laptop computer, netbook, etc.). The mobile network device 400 includes a display screen 410; a receiver and/or transmitter (e.g. transceiver) such as an antenna 411.

In one embodiment, the exemplary alert 450 (e.g., an email message, text message, display screen image, etc.) is communicated to security administrators for receipt/viewing on the mobile network device 400. For example, the exemplary alert 450 may indicate the urgency in handling one or more predicted attacks. Furthermore, the exemplary alert 450 may comprise instructions so as to prevent one or more predicted malware attacks. The exemplary alert 450 may also comprise information with respect to the origination of the potential attack, along with suspicious behavior that might confirm the attack with respect to a potential target.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method, comprising:
   receiving, by a first networked system, an attack alert associated with an object analyzed and identified as suspicious; and extracting, by the first networked system, features from the attack alert;

classifying, based on the extracted features, the attack alert by identifying the suspicious object as being at least a type of malware attack;

providing, by the first networked system, data associated with the classified attack alert to an attack-specific engine that conducts a plurality of analyses on the data and computes results for each of the plurality of analyses, wherein the attack-specific engine comprises a plurality of attack cores and each attack core of the plurality of attack cores being configured to (i) conduct at least an analysis of the plurality of analyses on a portion of the data associated with the classified attack alert in accordance with at least a corresponding type of malware attack and (ii) compute an attack-specific result of a plurality of attack-specific results, the attack-specific result including at least one or more features of the extracted features that pertain to the corresponding type of malware attack being analyzed by the attack core;

receiving the attack-specific result and computing an attack value based on an analysis of the extracted features including time-dependent features and time-independent features corresponding to a potential target; and generating, by the first networked system, an alert directed to one or more predicted attacks on the potential target based on the attack value.

2. The computerized method of claim 1, wherein the attack value represents a probability of the potential target being attacked.

3. The computerized method of claim 1, wherein the plurality of attack cores corresponds to a first attack core, the first attack core being configured to (i) extract the features from the attack alert and (ii) compute the attack-specific result including one or more features of the extracted features that pertain to a first type of malware attack being analyzed by the first attack core.

4. The computerized method of claim 1, wherein the potential target is associated with an industry type or geographic location.

5. The computerized method of claim 1, wherein the extracted features comprise at least one of various analysis logs from at least one of (i) one or more virtual machines, (ii) the metadata associated with the malware attack, or (iii) communication logs from a malicious content detection system.

6. The computerized method of claim 1, wherein the time-dependent features comprise at least one of the number of request-response sessions over a predetermined period of time, a time of day of the malware attack, a duration of the malware attack, or an execution time of the malware attack.

7. The computerized method of claim 1, wherein the time-independent features comprise at least one of a geographic location of the potential target, an industry, or a role or title of a specific party.

8. The computerized method of claim 1, wherein the attack value is generated based on the attack-specific result from each of the plurality of attack cores.

9. The computerized method of claim 1, wherein the alert being generated based on a comparison of the attack value with a predetermined threshold value to determine whether the alert is to be generated.

10. The computerized method of claim 1, wherein the first networked system corresponds to an early warning system.

11. A system comprising:
one or more processors; and
a storage module communicatively coupled to the one or more processors, the storage module including
   an input engine to (i) receive data associated with an attack alert associated with an object analyzed and identified as suspicious by a remote source, the attack alert including information associated with the suspicious object having one or more characteristics associated with a malware attack, and (ii) classify the received data to produce a classified result, the classified result is to identify at least a type of a malware attack,
   an attack-specific engine communicatively coupled to the input engine, wherein the attack-specific engine comprises a plurality of attack cores each directed to analyze the classified result according to at least a specific type of malware attack and at least a first attack core of the plurality of attack cores being configured to compute an attack-specific result including one or more features that pertain to the identified malware attack being monitored by the first attack core, and
   a correlation engine communicatively coupled to the attack-specific engine, the correlation engine to compute an attack value based on at least the attack-specific result and a consideration of potential attack targets, wherein the attack value represents a probability of a potential target being attacked and is compared to a threshold value to determine whether or not to generate an alert.

12. The system of claim 11, wherein the attack-specific engine comprises the plurality of attack cores and routing logic configured to route the classified result to at least one of the plurality of attack cores, each of the plurality of attack cores being configured as a plug-in that compares the one or more features included in the attack-specific results with features associated with a known malware attack.

13. The system of claim 11, wherein the attack-specific engine is configured to analyze the one or more features included in the attack-specific results to one or more of time-dependent features and one or more time-independent features.

14. The system of claim 13, wherein the one or more time-dependent features include at least one of (i) a time of day of the identified malware attack or (ii) a duration of the identified malware attack while the time-independent features include at least one of (i) a geographic location of a target of the identified malware attack or (ii) an industry attacked by the identified malware attack.

15. The system of claim 11, wherein the alert comprises at least one of an email message, text message, or a display screen image.

16. The system of claim 11, wherein the alert is communicated to one or more security administrators to indicate the urgency in handling one or more predicted malware attacks.

17. The system of claim 13, wherein the one or more time-dependent features comprise
   at least one of the number of request-response sessions over a predetermined period of time, a time of day of the malware attack, a duration of the malware attack, or the execution time of the malware attack; and
   wherein the one or more time-independent features comprise at least one of a geographic location of the malware attack target, an industry, or a role or title of a specific party.

18. The system of claim 11, wherein each attack core of the plurality of attack cores comprises feature logic specific to analyze a type of malware attack.

19. The system of claim 18, wherein the first attack core of the plurality of attack cores to analyze a different type of malware attack than a second attack core of the plurality of attack cores.

20. The system of claim 11, wherein each attack core of the plurality of attack cores comprises one or more logic models that, when executed, extracts certain data from the classified result for analysis to generate the attack-specific result.

21. The system of claim 11, wherein the first attack core of the plurality of attack cores being configured to analyze the information associated with the attack alert to information associated with previously known attacks, incidences or feature sets.

22. A computerized method, comprising:
receiving, by a first networked system, an attack alert associated with an object analyzed and identified as suspicious, the attack alert including information associated with the suspicious object having one or more characteristics associated with an exploit or other attack; and
providing the information associated with the exploit or other attack to an attack-specific engine that conducts a plurality of analyses directed to one or more types of attacks and computes results for each of the plurality of analyses each being provided as an attack-specific result;
receiving the attack-specific results and computing an attack value based on an analysis of extracted features from the attack alert including time-dependent features and time-independent features with features corresponding to potential targets; and
generating, by the first networked system, an alert directed to one or more predicted attacks based on the attack value,
wherein the attack-specific engine comprises a plurality of attack cores, each of the plurality of attack cores being directed to an analysis for at least a specific type of attack and at least a first attack core of the plurality of attack cores being configured to (i) extract features from the attack alert and (ii) compute an attack-specific result including one or more features of the extracted features that pertain to a first type of attack being monitored by the first attack core.

23. The computerized method of claim 22, wherein the attack value represents a probability of a potential target being attacked.

24. The computerized method of claim 22, wherein the one or more types of attacks corresponding to malware attacks.

25. The computerized method of claim 22, wherein the first type of attack includes a particular type of malware attack.

* * * * *